*INVENTOR.*
WALTER A. GUZELL
BY
Charles Richard Werner
ATTORNEY

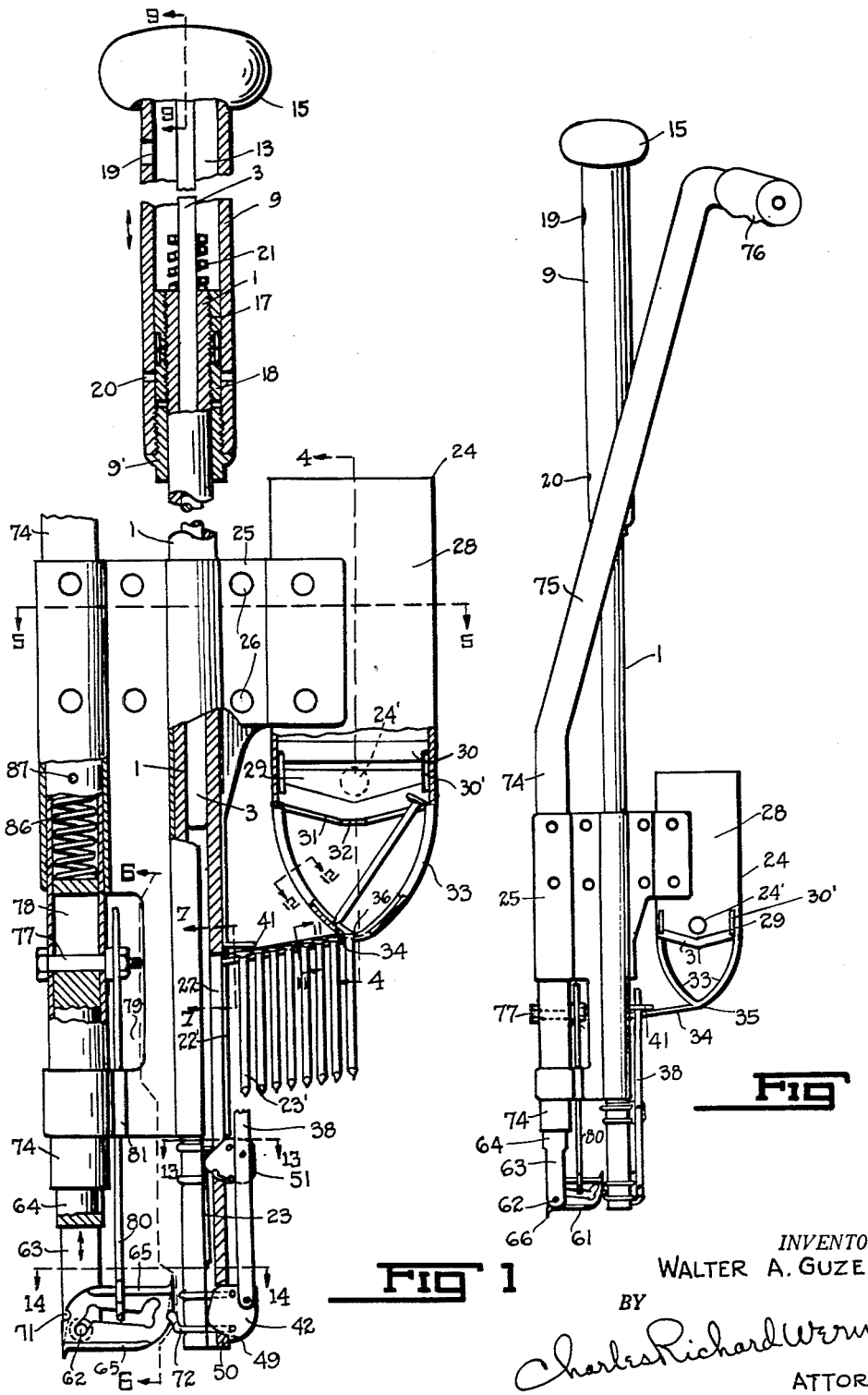

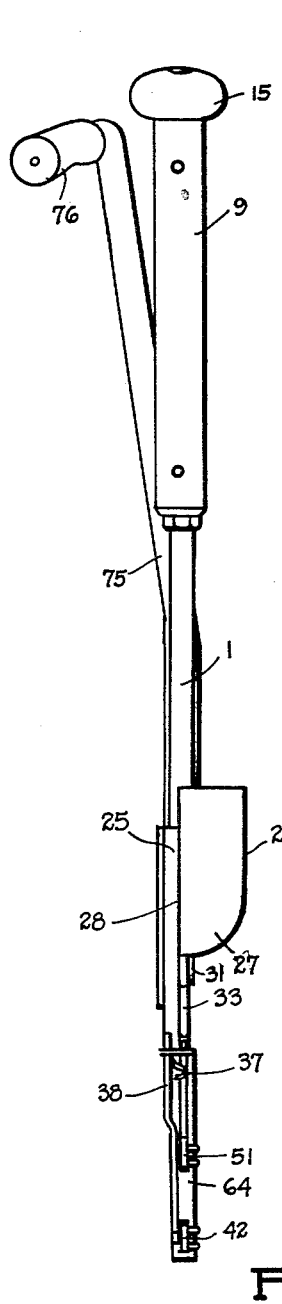
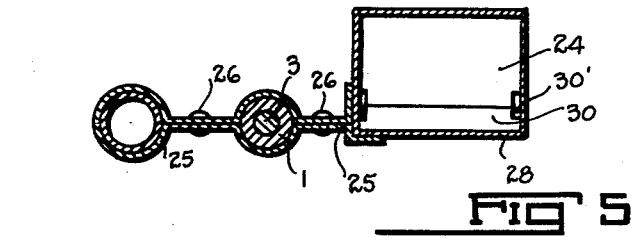
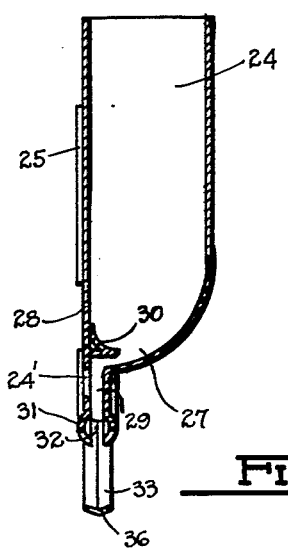
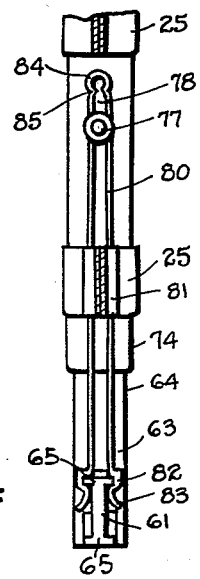
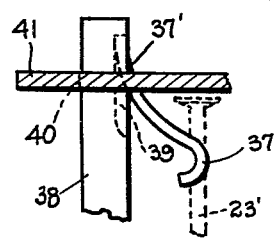
INVENTOR.
WALTER A. GUZELL
BY Charles Richard Werner
ATTORNEY June 14, 1960 W. A. GUZELL 2,940,080
NAILING DEVICE Filed July 2, 1956 5 Sheets-Sheet 3

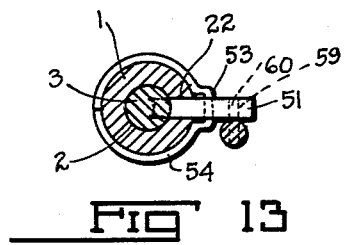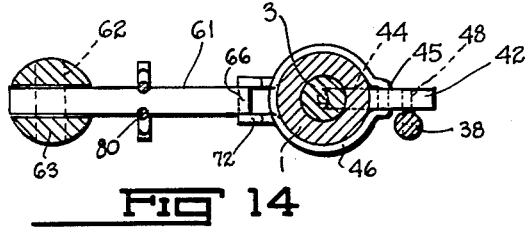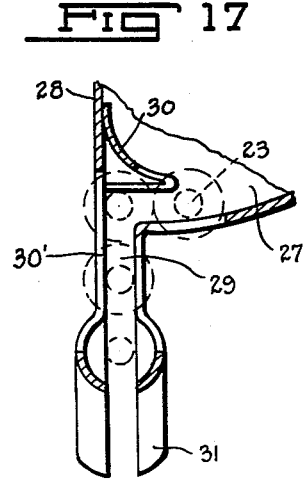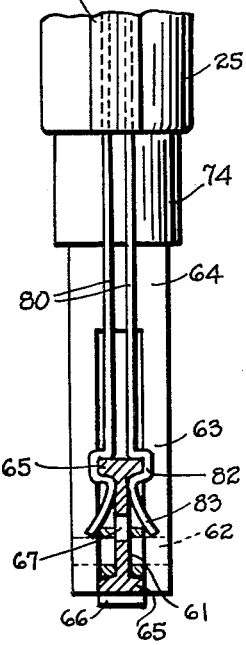

June 14, 1960   W. A. GUZELL   2,940,080
NAILING DEVICE
Filed July 2, 1956   5 Sheets-Sheet 5
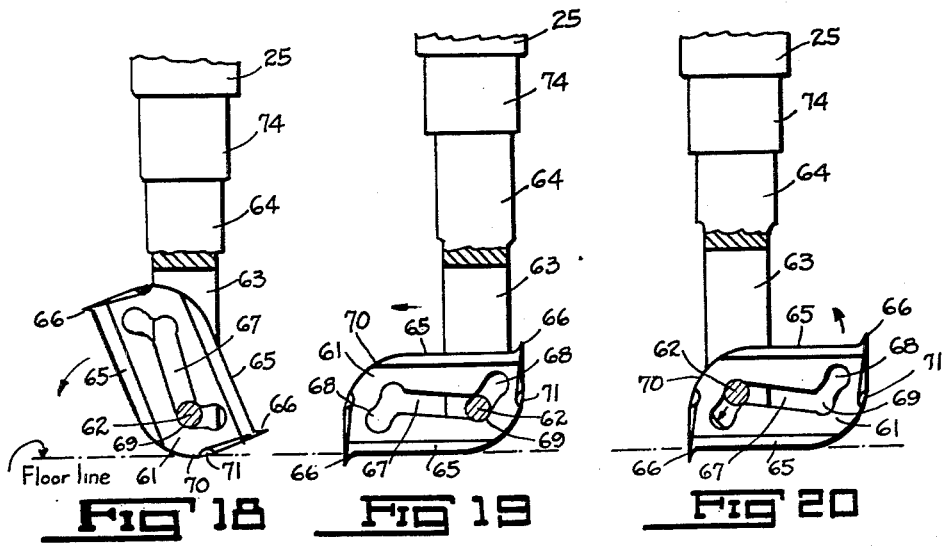
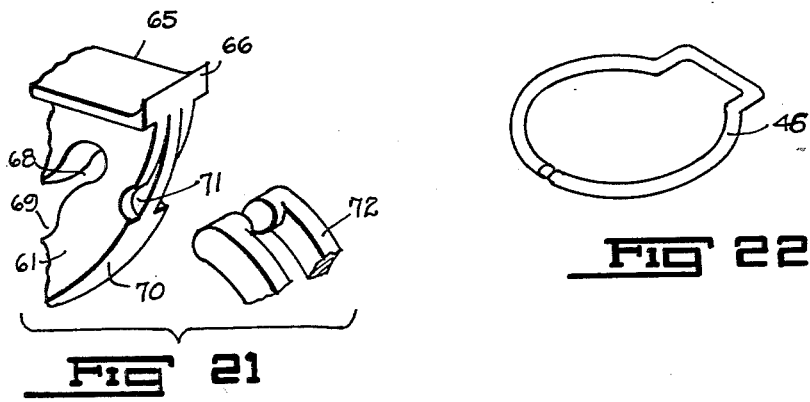
INVENTOR.
WALTER A. GUZELL
BY Charles Richard Werner
ATTORNEY

United States Patent Office 2,940,080
Patented June 14, 1960

2,940,080

NAILING DEVICE

Walter A. Guzell, 2453 W. Hirsch, Chicago, Ill.

Filed July 2, 1956, Ser. No. 595,469

17 Claims. (Cl. 1—46)

This invention relates in general to nailing devices and in particular to a portable manually operated, completely self-contained, magazine-fed nailing implement with means thereon for "self-walking" said implement along a relatively flat surface to space the nails.

In the nailing of subflooring, decking and roof sheathing, or in the nailing of crates, boxes or the like, and in any instance where flat material is nailed, insofar as I am aware there exists no implement which the operator can use while standing erect, which will be self-contained, will magazine feed and apply nails, and which will intermittently move the nailer a predetermined distance after each nail is driven home.

It is important in such a device that nail feeding means be positive and jamproof; that means be provided to time the feeding of each nail with the operation of the hammer; and that the human element be eliminated insofar as possible in the spacing of the nails. Also, the impact of continuous use of the nailing implement should be minimized to alleviate the strain on the operator of the device.

With the above desired goals in mind the objects of my invention are:

First; to provide a nailing implement with individual nail feeding means from a magazine, means for positioning individual nails in a barrel, a hand operated hammer reciprocably mounted in the barrel, and means for preventing feeding of a nail until the nail in the barrel has been driven home.

Second; to provide a nailing implement with a spacing paw, operable after each nail is driven home, spacing each nail at predetermined intervals, the action of the paw aiding the hammer recoil action.

Third; to provide a long-handled nailing implement operable while the user is in a standing position.

Fourth; to provide a nailing implement with two handles, one for guiding the nailer and the other for hammer actuation.

Fifth; to provide a nailing implement with shock cushioning means in the handle, reducing the impact on the operator.

Sixth; to provide an air chamber in the hammer handle with outlets so positioned as to provide air circulation to the operator's palm to minimize perspiration thereof as the hammer is operated.

Seventh; to provide for adjustment of air intake on the upward stroke providing an air bypass valving means permitting desired degree of air flow into the air chamber.

Other objects and advantages as well as the construction and operation of my invention will be apparent by reference to the following specifications in connection with the accompanying drawings in which:

Fig. 1 is a vertical fragmentary cross sectional view through my invention with parts shown in elevation and other parts being broken away for clarity of illustration.

Fig. 2 is a reduced side elevational view of the nailing implement comprising my invention.

Fig. 3 is a reduced vertical, rear elevational view of the nailer.

Fig. 4 is a vertical cross section on the line 4—4 of Fig. 1 through the nail magazine.

Fig. 5 is a horizontal cross sectional view on the line 5—5 of Fig. 1.

Fig. 6 is a vertical elevational view on the line 6—6 of Fig. 1, with parts in section.

Fig. 7 is a fragmentary view on the line 7—7 of Fig. 1 with parts being shown in section.

Fig. 13 is an enlarged horizontal cross sectional view on the line 13—13 of Fig. 1.

Fig. 14 is an enlarged horizontal cross sectional view on the line 14—14 of Fig. 1.

Fig. 15 is an enlarged fragmentary detail view of the lower portion of the device with parts being shown in section and the hammer in nail driving position.

Fig. 16 is a fragmentary elevational view of the lower end of the walking paw mechanism with parts being shown in section.

Fig. 17 is an enlarged fragmentary detailed sectional view on the line 17—17 of Fig. 10.

Figs. 18, 19 and 20 are fragmentary elevational views, partly in section, of the lower end of the walking paw mechanism in various stages of movement of the walking paw.

Fig. 21 is an enlarged fragmentary isometric view of one end of the walking paw and the split lock clip which intermittently engages said paw.

Fig. 22 is an enlarged isometric view of the resilient ring clip, three identical clips being used.

Figure 8:
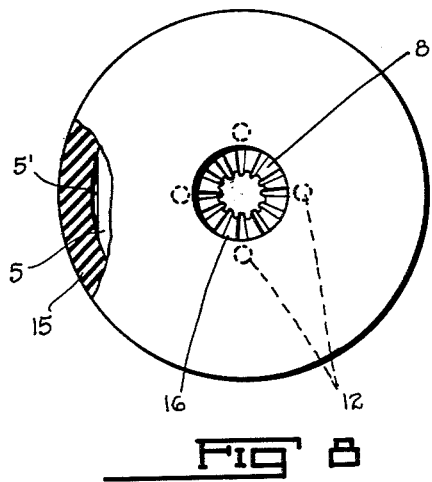
Fig. 8 is an enlarged top plan view of the hammer handle with parts broken away in section.
Figure 10:
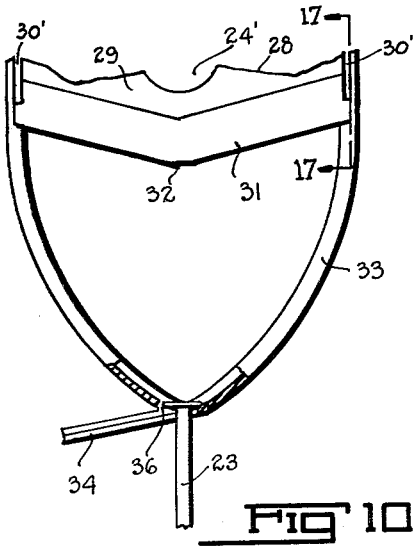
Fig. 10 is a fragmentary enlarged cross sectional view of the lower end of the nail feeding mechanism with parts being shown in elevation.
Figure 9:
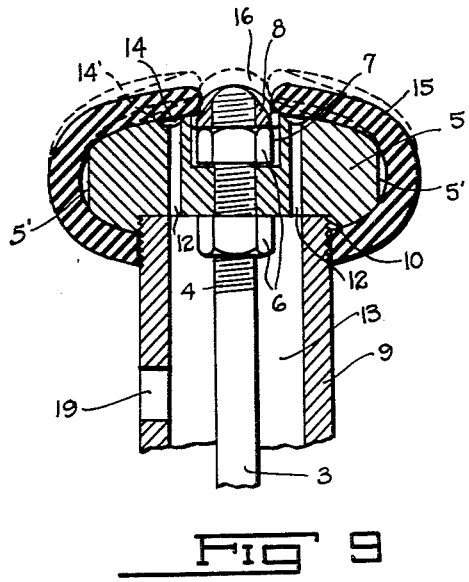
Fig. 9 is an enlarged cross sectional view on the line 9—9 of Fig. 1.
Figure 11:
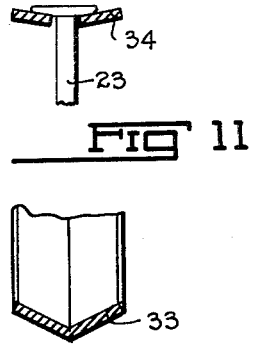
Fig. 11 is an enlarged cross sectional view on the line 11—11 of Fig. 1 shownig a detail of the track.

Referring now to the drawings by numerals of reference, 1 designates a hammer tube or barrel in the bore 2 of which hammer 3 is reciprocably guided. At its extreme upper end the threaded portion 4 of the hammer carries a cap 5 between nuts 6, the cap having a recess 7 in which one of said nuts is positioned. Suitable flats 5' may be provided for assembly of the cap.

A fluted adjustment nut 8 is also threadedly carried on the upper end of hammer 3 and is used in the manner hereinafter specified.

A cylinder 9 is threadedly secured in recess 10 in underside of cap 5 and depends therefrom concentrically with the hammer barrel 1 and hammer 3. A plurality of ports 12 lead from chamber 13 within the cylinder 9 to an annular groove 14 in the top of the cap 5. A rubber palm grip cap 15 surrounds the cap 5 covering annular groove 13 and is provided with central aperture 16.

The hammer barrel 1 is threaded at its upper end and carries piston type bushings 17 and 18 in the chamber 13. Ports 19 and 20 may be provided in the chamber 13 as well as a recoil spring 21, the operation of the shock absorbing handle being explained in detail hereinafter.

Adjacent the lower end of hammer barrel 1 is provided a longitudinal slot 22 through which nails 23 may be introduced to barrel bore 2.

A nail magazine or hopper 24, of rectangular cross section is manually loaded with nails arranged with their shanks horizontal and parallel to each other and to wall 28. The magazine may be supported on bracket 25 which in turn is carried by barrel 1, suitable fastening members 26 holding the two portions of the bracket together and in intimate engagement with the barrel. Where bracket 25 adjoins slot 22, the bracket is provided with slot 22' to coincide with said slot 22. Access opening 24' is provided in the nail magazine to permit reaching the nails should jams occur.

The lower portion 27 of the hopper 24 curves downwardly toward wall 28, facilitating alignment of the nail with a chute 29 provided at the lower end of wall 28, a baffle 30 directing the nails away from said wall as shown in Fig. 4, and permitting nails to enter the chute one at a time, the nail heads freely clearing slotted opening 30' at each side of the hopper. A slotted trough 31 extends across the lower end of the chute 29, the shank of the nail dropping through the slot in the trough while the head of the nail is freely movable in said trough, the latter being angularly disposed toward the central axis of the magazine at which point is located an aperture 32 through which the nail heads may be released from the trough.

Figure 12:
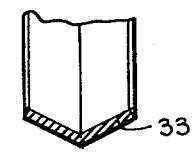
Fig. 12 is an enlarged cross sectional view on the line 12—12 of Fig. 1 showing a detail of the nail guide.

Nail guides 33 extend arcuately from the ends of the trough meeting at a point below and in alignment with the aperture 32, the points of the nails riding in the guides which are V-shaped in cross section as shown in Fig. 12.

Tapered and slotted track 34 extends angularly downward from the juncture 35 of guides 33, a suitable aperture 36 being provided in the guide to permit passage of nail head from the guide to the track. The shank of the nail will drop through slotted track 34 and the nails will align themselves on said track 34 in abutting relation, gravitating toward the slot 22 in the barrel 1.

To retain and release nails individually from the inclined track 34, the vibration of the nailing device is used together with a resilient finger 37, carried by release rod 38 and adapted to be removably interposed between the first nail 23' on the track 34 and the slot 22 in the barrel 1. The upper section 37' of finger 37 is attached at its upper end to the rod 38 in which a groove 39 is provided for reception of the section 37' when the rod 38 is elevated and section 37' contacts the side of the aperture 40 in flange support 41 which extends from bracket 25.

A nail release pawl 42 has a cam surface 43 extending into the path of hammer 3 through slot 44 at the extreme lower end of barrel 1, the pawl being pivotly supported at 45 by resilient ring clip 46, releasably positioned in annular groove 47 in the barrel 1. The release rod 38 is pivotly secured at 48 to the release pawl 42 and a stop flange 49 on pawl 42 serves to limit movement of said pawl by abutting shoulder 50 of the barrel 1.

A nail retaining pawl 51 with cam surface 52 is pivotly supported at 53 on resilient ring clip 54 which may be detachably received in annular groove 55 in barrel 1. The portion of the pawl having the cam surface extends through the lower end of slot 22, the head of the nail being shown resting on the cam surface (see Fig. 1), a lower resilient clip 56 in annular groove 57' normally urged into notch 57 retaining the pawl 51 in nail retaining position. A second notch 58 is provided for engagement with the clip 56 when the pawl is held in hammer clearing position. The pawl 51 is provided with slot 59 in which rides pin 60 carried by rod 38 by means of which pawl 51 can be returned to nail retaining position after it has been moved to nail releasing position.

A walking or spacing paw 61 is mounted on pin 62 passing through forked end 63 of paw rod 64. The paw has diametrically opposed and parallel flanges 65 with work engaging claws 66. Slot 67 has angularly disposed portions 68 and pivot notches 69 at the juncture of the slot and the portions 68. Diametrically opposed arcuate surfaces 70 lie between the parallel flanges 65 and are provided with notches 71 adapted to lock the walking paw against movement at predetermined intervals by engagement with resilient split lock clip 72 mounted in annular groove 73 in barrel 1, the clip 72 being in pivotal engagement with pawl 42.

Paw rod 64 is vertically slidable in barrel 74 which is secured to bracket 25 in any suitable manner, the upper part of barrel 74 forming a handle 75 which may be angularly disposed as shown in Fig. 2 and provided with hand grip 76.

A shouldered pin 77 passes through barrel 74 and is adapted to work in slotted aperture 78 in the paw rod. The bracket 25 has cutout portion 79 to clear the pin 77. A bifurcated paw spring 80 is slidably mounted on shouldered end of pin 77 and extends through guide 81 formed in the bracket 25. The lower end of spring 80 is formed as shown in Fig. 6 with offset portions 82 to fit around upper flange 65, the extreme ends 83 of the spring being arcuately shaped for snapping onto the flanges as hereinafter explained. The upper end of spring 80 has a loop 84 with restriction 85 to retain the loop on the pin 77 at a certain stage in the operation of the device.

The upper end of paw rod 64 bears against spring 86 which normally urges it downwardly, a pin 87 through the barrel 74 at the other end of the spring serving as a spring stop.

Operation

In the operation of my nailing implement, the magazine 24 is loaded with nails 23 it being important only that the nails be parallel with each other and with the wall 28, the nail heads being either at one side of the magazine or the other. Slight vibration of the device will cause the nails to gravitate point first through slotted trough 31, the baffle 30 directing them singly into the chute 29.

As the shank of each nail passes through slotted trough the point rides down V-guide 33 and the head of the nail moves toward aperture 32 at which time the point of the nail will be aligned in slotted track 34 and the nail will drop accurately downwardly, the head passing through aperture 36 to enter and ride down slotted track 34 to a position adjacent longitudinal slot 22 in the hammer tube 1. The nail will be restrained from entering the slot by resilient finger 37 carried on rod 38. The loading process continues until track 34 is full at which time the next nail will be prevented from dropping. Thereafter, nails are individually released from the magazine as each space is made available on the slotted track 34. Use of the nailing device can commence either before or after the track is loaded as it will load during nailing.

When nails are on the track 34 the operator grasps the rubber capped member 5 in one hand and the hand grip 76 in the other, and sharply drives down the hammer 3 until it strikes arcuate surface 43 of nail release paw 42, said paw pivoting at 45 will move nail release rod 38 upwardly forcing upper section 37' of nail release spring 37 into aperture 40 in the rod 38 and moving spring 37 out of nail restraining position, the nail 23' passing through slot 22 and bearing against the hammer while it is in its downward position. Nail retaining pawl 51 which was contacted by the hammer during its descent is being restrained against return to nail retaining position by resilient clip 56 in notch 58.

When the hammer is withdrawn and has cleared pawls 42 and 51, resilient clip 72 through its connection with pawl 42, will urge rod 38 downwardly, as said clip tends to move toward its natural position moving pawl 42 into the hammer bore and pawl 51 into nail retaining position in the bore. When hammer 3 has cleared slot 22 the nail which finger 37 has released to position in slot 22 will gravitate into the hammer bore 2 and come to rest with its head on cam surface 52 of nail retaining pawl 51.

This operation is repeated after each nail is driven home but it is necessary that the hammer clear slot 22 on its upstroke before the hammer bore can be reloaded. With this arrangement it is possible to strike the nail a number of times if necessary to drive it home inasmuch as the next nail cannot be injected until the nail being driven home has passed the pawl 42 and the hammer has been retracted above slot 22.

The upward stroke of the hammer is aided by recoil spring 21. Impact shock on the operator is minimized by the shock absorbing arrangement at the upper end of the hammer tube 1, where bushing 17 on said tube 1 works in cylinder 9, vent 19 permitting discharge of air and vents 20 permitting intake of air on the downstroke, the air action being reversed on the upstroke. Also, on the downstroke, a portion of the air is discharged through ports 12 into annular groove 14, normally covered by the rubber cap 15 held in the operator's palm. Adjustment of the fluted nut 8 will raise or lower the rubber cap 15 and thereby vary air movement into and out of the chamber, the sealing effect of the rubber cap on the annular groove 14, and the effect of air pressure on the operator's palm. This movement of air out through annular groove 14 and central aperture 16 will aid in reducing perspiration of the operator's palm.

The relation between the rubber cap 15 and the cap 5 is such that air pressure created at the end of the downward stroke of the hammer after port 19 is closed by upper end of hammer barrel 1 will tend to force the rubber cap away from cap 5 providing an air space 14' between the cap 5 and rubber cap 15 to cushion the operator's hand.

With ports 20 positioned above the lower end of the chamber 13, a compressed air stop is provided at the end of the upward stroke as the compression of air in the space below ports 20 aids in starting the reverse movement of the hammer.

When the nail is initially started and hammer tube 1 is centered over the position where the first nail is to be driven, one claw 66 of paw 61 is engaging the work. The reaction caused by impact of the hammer against the work, as well as the motivation by the operator tends to raise the entire device off the work. On upward movement of the device, spring 86 bearing against pin 87 in the barrel 74 urging the paw rod 64 downwardly tends to keep the paw in contact with the work, the paw 61 pivoting on pin 62 in the end of the extension 68 and riding on arcuate surface 70 walking the entire device linearly along the surface of the work being nailed until the opposite claw 66 strikes and grips the work. See Figs. 18, 19 and 20. This pivoting action of the paw is aided by paw spring 80 which is offset from pivot pin 62 and as the paw swings, the offset portion 82 slides off flange 65 and is then snapped onto the opposite flange which strikes and spreads arcuate ends 83 of the spring. Loop 84 of the paw spring will encircle pin 77 when spring 86 forces barrel 74 and its related components upwardly before the paw is imparted its walking pivotal action.

As the paw begins its pivotal movement about pivot pin 62 the entire device carried on pin 62 in the lower end of rod 64 moves in slots 68 until pin 62 is in pivotal position in notch 69, the pivotal action of the paw being greatly accelerated at this point until the paw has reversed its position 180° and the claw has engaged the work. The momentum of the device will cause it to slide on the pin 62 along the raceway 67 to a new nailing position. The paw action is a snap action with considerable force, sufficient to contribute materially to the return action of the hammer after its impact with the nail.

If a weak blow is imparted by the hammer and the nail is not completely driven the recoil of the hammer will also be weak and it will not rise to the point where another nail will be fed, nor will the recoil be sufficient to cause the pawl to operate and step the nailing device to a new position. Therefore, the hammer can be again driven downwardly, several times if necessary, to completely drive the nail at which time the recoil can be manually aided by the operator so as to bring the hammer up to its top limit, actuating the nail feeding means and the pawl actuating means.

The automatic spacing of the nails will depend on the size of the paw 61. It can be designed for specific jobs. Spacing of nails in roof and floor sheathing or decking is more or less standard. When regular spacing is not desired the use of the spacing paw can be ignored and the nailer positioned wherever a nail is to be driven.

It is obvious that changes in form, proportion and details of construction may be resorted to without departing from the spirit of my invention and I reserve all rights to such changes as come within the scope of these specifications and the claims which follow.

What I claim as new and desire to secure by Letters Patent is:

1. In a nailing device, a nail hammer bore, a nail hammer reciprocably mounted in the bore, a nail magazine, nail feeding means feeding nails from the nail magazine to the nail hammer bore, releasable nail retaining means in the bore below the point of entry of the nails to the bore, nail restraining means preventing entry of nails to the hammer bore until a nail has been driven by the hammer from the nail retaining means and from the bore and the hammer has been retracted passed the position where nails are fed to the bore, nail spacing means, locking means rendering the nail spacing means normally inoperative, and release means tripped by movement of the hammer freeing the locking means after each nail has been driven home.

2. In a nailing device, a nail hammer bore, a nail hammer reciprocably mounted in the bore, a nail magazine, nail feeding means feeding nails from the nail magazine to the nail hammer bore, releasable nail retaining means in the bore below the point of entry of the nails to the bore, nail restraining means preventing entry of nails to the hammer bore until a nail has been driven by the hammer from the nail retaining means and from the bore and the hammer has been retracted passed the position where nails are fed to the bore, and nail spacing means operable after each nail has been driven home, said nail restraining means and nail spacing means being simultaneously actuated after each nail has been driven home.

3. In a nailing device, a nail hammer bore, a nail hammer reciprocably mounted in the bore, a nail magazine, nail feeding means feeding nails from the nail magazine to the nail hammer bore, releasable nail retaining means in the bore below the point of entry of the nails to the bore, nail restraining means preventing entry of nails to the hammer bore until a nail has been driven by the hammer from the nail retaining means and from the bore and the hammer has been retracted passed the position where nails are fed to the bore, a spring mounted arm mounted in vertically movable and substantially parallel relation to the nail hammer bore, and a walking paw pivotally and slidably mounted adjacent the lower end of said arm.

4. In a nailing device, a nail hammer bore, a nail hammer reciprocably mounted in the bore, a nail magazine, nail feeding means feeding nails from the nail magazine to the nail hammer bore, releasable nail retaining means in the bore below the point of entry of the nails to the bore, nail restraining means preventing entry of nails to the hammer bore until a nail has been driven by the hammer from the nail retaining means and from the bore and the hammer has been retracted passed the position where nails are fed to the bore, and nail spacing means operable after each nail has been driven home, said nail spacing means including a spring mounted arm, a walking paw carried by said arm, a handle sleeved over the arm and in rigid spaced relation to the barrel forming the nail hammer bore.

5. In a nailing device, a nail hammer bore, a nail hammer reciprocably mounted in the bore, a nail magazine, nail feeding means feeding nails from the nail magazine to the nail hammer bore, releasable nail retaining means in the bore below the point of entry of the nails to the bore, nail restraining means preventing entry of nails to the hammer bore until a nail has been driven by the hammer from the nail retaining means and from the bore and the hammer has been retracted passed the position where nails are fed to the bore, and nail spacing means operable after each nail has been driven home, said nail spacing means including a handle having the lower portion thereof spaced from and substantially parallel to the barrel forming the nail hammer bore, an extendible arm yieldably carried in the handle and normally urged toward extended position, a walking paw pivotally and slidably carried at the lower end of the arm and a spring between the paw and the handle adjacent the upper end of the arm, said spring being intermittently releasable and attachable to the paw as said paw swings end over end in its spacing operation.

6. In a nailing device including a nail hammer bore, nail hammer, and a nail magazine, nail feeding means including a slotted trough in the magazine angularly disposed from the sides of the magazine toward the center, an aperture in the center of the trough for passage of the nail heads therethrough, arcuate guides from the sides of the magazine meeting at a point below and in alignment with the aperture in the trough, a slotted track inclined from the juncture of the arcuate guides to the barrel forming the nail hammer bore, and an aperture through said barrel for passage of nails from the inclined track to the nail hammer bore.

7. The structure as specified in claim 6, said nail restraining means comprising a finger yieldably interposed between the first nail on the slotted track and the barrel, and finger actuating means operable by movement of the hammer for releasing nails individually.

8. The structure as specified in claim 6, said nail restraining means comprising a finger yieldably interposed between the first nail on the slotted track and the barrel, a pawl mounted adjacent the lower end of the barrel in the path of the hammer, and means between the pawl and the finger whereby said finger will be retracted to release nails individually upon contact of the pawl by the hammer.

9. The structure as specified in claim 6, including a pawl mounted adjacent the lower end of the barrel in the path of the hammer, a rod pivoted to the pawl and slidably carried adjacent the slotted track, said finger being carried by the rod and retractable from nail restraining position upon contact of the pawl by the hammer and upward movement of the rod.

10. In a nailing device, a nail hammer bore, a nail hammer reciprocably mounted in the bore, a nail magazine, nail feeding means feeding nails from the nail magazine to the nail hammer bore, releasable nail retaining means in the bore below the point of entry of the nails to the bore, nail restraining means preventing entry of nails to the hammer bore until a nail has been driven by the hammer from the nail retaining means and from the bore and the hammer has been retracted passed the position where nails are fed to the bore, and an air chamber at the upper end of the barrel insulating the operator from the impact shock of the hammer.

11. In a nailing device, a nail hammer bore, a nail hammer reciprocably mounted in the bore, a nail magazine, nail feeding means feeding nails from the nail magazine to the nail hammer bore, releasable nail retaining means in the bore below the point of entry of the nails to the bore, nail restraining means preventing entry of nails to the hammer bore until a nail has been driven by the hammer from the nail retaining means and from the bore and the hammer has been retracted passed the position where nails are fed to the bore, and a shock absorbing means carried at the upper end of the barrel, said shock absorbing means including a cylinder sleeved on the barrel for slidable movement thereon, a chamber in the cylinder, vent ports adjacent the lower end of the cylinder, vent ports adjacent the upper end of the cylinder, and piston forming means at the upper end of the barrel.

12. The structure as specified in claim 11, including a cap member on the cylinder, the hammer being secured to the cap member.

13. The structure as specified in claim 11, including a cap member on the cylinder, the hammer being secured to the cap member, vent openings through the cap member and vent control means in the cap member.

14. The structure as specified in claim 11, including a cap member on the cylinder, the hammer being secured to the cap member, vent openings through the cap member and vent control means in the cap member.

15. The structure as specified in claim 11, including a cap member on the cylinder, the hammer being secured to the cap member, and a resilient cover member over the cap member.

16. The structure as specified in claim 11, including a cap member on the cylinder, the hammer being secured to the cap member, a resilient cover member over the cap member, vent openings through the cap member normally closed by the resilient cover, said cover being yieldable to vent opening position when sufficient pressure has been built up during the downward stroke of the hammer.

17. In combination with a nail applicator, a walking means comprising a work contacting member, locking means normally restraining the work contacting member, and means operable after each nail has been driven home by the nail applicator for intermittently releasing the locking means to intermittently operate the work contacting member and walk the nail applicator.

References Cited in the file of this patent

UNITED STATES PATENTS

| Number | Name | Date |
|---|---|---|
| 163,456 | Carver | May 18, 1875 |
| 222,997 | Lambert | Dec. 30, 1879 |
| 225,482 | Mower | Mar. 16, 1880 |
| 392,963 | McCormack | Nov. 13, 1888 |
| 958,002 | Phelan | May 17, 1910 |
| 1,509,492 | Schaub | Sept. 23, 1924 |
| 1,671,660 | Vilneau | May 29, 1928 |
| 1,716,579 | Dougherty | June 11, 1929 |
| 2,418,118 | Hamilton | Apr. 1, 1947 |
| 2,546,354 | Bacon | Mar. 27, 1951 |